United States Patent [19]

Hunt et al.

[11] 4,158,176

[45] Jun. 12, 1979

[54] SPATIAL FILTER SYSTEM AS AN OPTICAL RELAY LINE

[75] Inventors: John T. Hunt; Paul A. Renard, both of Livermore, Calif.

[73] Assignee: The United States of America as represented by the United States Department of Energy, Washington, D.C.

[21] Appl. No.: 830,972

[22] Filed: Sep. 6, 1977

[51] Int. Cl.² .............................................. H01S 3/02
[52] U.S. Cl. ................................. 330/4.3; 331/94.5 T; 350/54
[58] Field of Search .................... 330/4.3; 331/94.5 T, 331/94.5 C, 94.5 Q; 350/162 SF, 54

[56] References Cited

U.S. PATENT DOCUMENTS

| 2,929,922 | 3/1960 | Schawlow et al. | 330/4.3 |
| 3,292,102 | 12/1966 | Byrne | 331/94 JQ |
| 3,513,402 | 5/1970 | Marrison | 330/4.3 |
| 3,626,312 | 12/1971 | Snitzer | 330/4.3 |
| 3,886,482 | 5/1975 | Gregg et al. | 330/4.3 |
| 3,980,397 | 9/1976 | Judd et al. | 331/94.5 T |
| 4,053,845 | 10/1977 | Gould | 330/4.3 |

FOREIGN PATENT DOCUMENTS

| 1514397 | 6/1969 | Fed. Rep. of Germany | 250/199 |
| 7004185 | 2/1970 | France | 330/4.3 |

OTHER PUBLICATIONS

Hunt et al., "Improved Performance . . . Spatial Filters," 4/77, pp. 779–782, Applied Optics, vol. 16, #4.
Hunt et al., "Suppression of Self-Focussing . . . Spatial Filtering," 8/5/77, pp. 1–21.
Glaze, "High Energy Glass Lasers," 4/76, pp. 136–142, Optical Engineering, vol. 15, #2.
Baranova et al., "Diffraction and Self-Focusing During Amplification . . .", 5/75, Soviet Journal of Quantum Electronics, vol. 4, #8, pp. 1362–1366.

Primary Examiner—Nelson Moskowitz
Attorney, Agent, or Firm—Roger S. Gaither; L. E. Carnahan; P. Martin Simpson, Jr.

[57] ABSTRACT

A system consisting of a set of spatial filters that are used to optically relay a laser beam from one position to a downstream position with minimal nonlinear phase distortion and beam intensity variation. The use of the device will result in a reduction of deleterious beam self-focusing and produce a significant increase in neutron yield from the implosion of targets caused by their irradiation with multi-beam glass laser systems.

7 Claims, 3 Drawing Figures

NEAR FIELD BEAM PROFILES WITHOUT RELAY ELEMENT

PHASE DISTORTION = ONE-HALF WAVE

| f = 150 cm | f | f | f | f |

RELATIVE BEAM INTENSITY
PEAK TO AVG. INTENSITY = 1.42   = 1.61   = 2.04   = 2.27   = 2.43   = 2.81

NEAR FIELD BEAM PROFILES WITH RELAY ELEMENT

PEAK TO AVG. INTENSITY = 1.42          = 1.85   = 1.56   = 1.42   = 1.61

SPATIAL FILTER SYSTEM AS AN OPTICAL RELAY LINE

BACKGROUND OF THE INVENTION

The invention described herein was made at the Lawrence Livermore Laboratory in the course of, or under, contract No. W-7405-ENG-48, between the United States Energy Research and Development Administration and the University of California.

This invention relates to an optical system utilized in high power laser systems, and more particularly, to the use of multiple spatial filters as elements of an optical relay line in laser systems.

The phenomenon of self-focusing is one of the primary factors that limits the output power of high power glass lasers. The dependence of the index of refraction on the intensity in the optical components of the laser causes intensity fluctuations on an otherwise smooth beam to be amplified. If this amplification is left unchecked it will cause a loss of focusable power, and ultimately result in damage to the components of the laser system.

If it were possible to maintain a spatially uniform beam intensity while propagating through the consecutive nonlinear optical components that comprise the laser chain, the beam entering any glass component would resist self-focusing within said component. The effect of the intensity dependent refractive index of the glass would then do little to enhance power depleting intensity variation.

SUMMARY OF THE INVENTION

The present invention, a set of spatial filters arranged in a particular configuration, minimizes the beam nonuniformity arising from diffraction and self focusing by acting as an optical relay which translates with minimal deviation all rays in the beam at the initiating aperture to a desired position downstream from this aperture. Due to the invention, in theory and in practice, a beam arrives, with little distortion, near the output aperture of the laser. Thus the input beam can be relayed through consecutive amplification stages with minimal nonlinear aberration.

Therefore, it is an object of the invention to provide a spatial filter assembly as an optical relay line.

A further object of the invention is to provide a means for optically relaying a laser beam from an initial position in the laser system where the beam power is low to a downstream position where the beam power is high with minimal phase distortion and beam intensity variation.

Another object of the invention is to provide a set of spatial filters arranged in a particular configuration which minimizes beam nonuniformity arising from diffraction and self-focusing by acting as an optical relay which translates with minimal deviation all rays in the beam at the initiating aperture to a desired position downstream from this aperture.

Other objects of the invention will become readily apparent from the following description and accompanying drawings.

DESCRIPTION OF THE INVENTION

The invention is a spatial filter arrangement or assembly for optically relaying a laser beam from an initial position in the laser system where the beam power is low to a downstream position where the beam power is high with minimal phase distortion and beam intensity variation. In a glass laser amplifier chain, such as that utilized in the implosion of targets for known applications such as plasma generation, physics studies, or sources of neutrons, x-rays, alpha particles, etc., multiple spatial filters made in accordance with specifications of the invention can be incorporated into the laser chain and substantially increase the beam power of the laser. For example, in the two arm glass laser system known as Argus assuming that both arms produce $1 \times 10^9$ neutrons/target burst the increased beam power provided by the invention should yield an excess of $5 \times 10^9$ neutrons/target burst.

Figure 1:
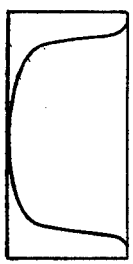
FIG. 1 graphically illustrates intensity distributions as an input beam propagates undisturbed over a distance.
Figure 1:
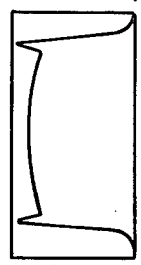
Figure 1:
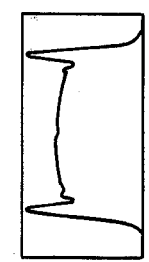
Figure 1:
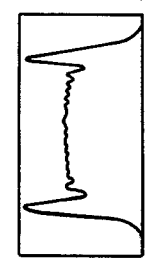
Figure 1:
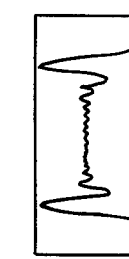
Figure 1:
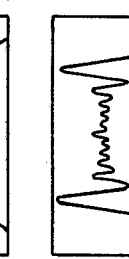
Figure 1:
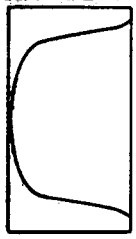
Figure 1:
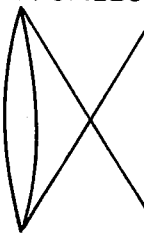
Figure 1:
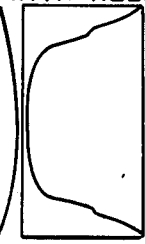
Figure 1:
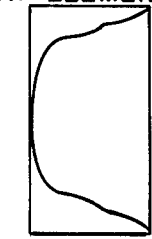
Figure 1:
Figure 1:
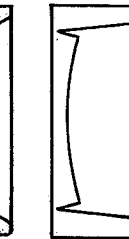

An input laser pulse may have a spatial intensity (and also phase variation), $I(r; z=0)$, as shown in FIG. 1, where r denotes radial distance from the beam central axis. If one allows the beam to propagate undisturbed over a distance, L, the new intensity distribution $I(r; z=L)$ would develop variations as shown in FIG. 1. In a geometric sense, the rays comprising the input beam (at $z=0$) are not all parallel to the beam axis, and thus, when extended along the propagation path, they tend to cross. The beam itself, trying to follow the directions indicated by these initial rays will develop intensity ripples as shown in the figure. The present invention, acting as an optical relay line, merely translates the entire collection of beam rays at $Z=0$ to $Z=L$ so that, within limits, $$I(Mr; Z=L) = I(r; Z=0)$$

and no (new) intensity variations are manifest. That is, the final ray directions are the same as the initial ray directions, so no ripples develop. A simple magnification, M, is allowed.

Figure 2:
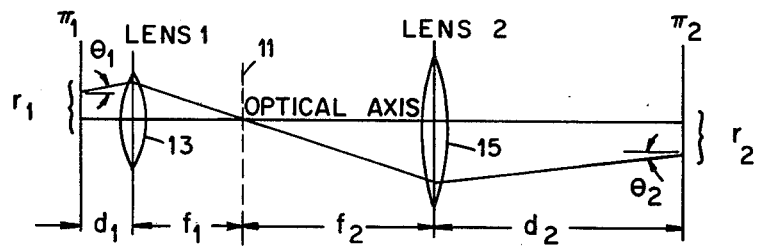
FIG. 2 illustrates an embodiment of a spatial filter assembly made in accordance with the invention.

An element of the present invention, shown in FIG. 2, also includes a pinhole 11 which is located at or near the common focal plane of two thin lenses 13 and 15 which have respective focal lengths $f_1$ and $f_2$ and are separated by a distance $d = f_1 + f_2$. Adopting the ray matrix approach for paraxial rays, the radial displacement r and angular orientation $u = dr/dz \cong \theta$ of any ray in two displaced transverse planes $\pi_1$ and $\pi_2$ ($Z = -f_1 - d_1$ and $Z = f_2 + d_2$) are related by the optical transfer matrix, vis.

$$\begin{bmatrix} r_2 \\ u_2 \end{bmatrix} = \begin{bmatrix} 1 & d_2 \\ 0 & 1 \end{bmatrix} \begin{bmatrix} 1 & 0 \\ \frac{-1}{f_2} & 1 \end{bmatrix} \begin{bmatrix} 1 & f_1+f_2 \\ 0 & 1 \end{bmatrix} \begin{bmatrix} 1 & 0 \\ \frac{-1}{f_1} & 1 \end{bmatrix} \begin{bmatrix} 1 & d_1 \\ 0 & 1 \end{bmatrix} \begin{bmatrix} r_1 \\ u_1 \end{bmatrix} = \begin{bmatrix} A & B \\ C & D \end{bmatrix} \begin{bmatrix} r_1 \\ u_1 \end{bmatrix} = \quad (1)$$

$$\begin{bmatrix} \frac{-f_2}{f_1} f_1 + f_2 - \frac{f_2}{f_1} d_1 - \frac{f_1}{f_2} d_2 \\ 0 \qquad\qquad -\frac{f_1}{f_2} \end{bmatrix} \begin{bmatrix} r_1 \\ u_1 \end{bmatrix}$$

If one then chooses $d_1$ and $d_2$ so that $$f_1 + f_2 - \frac{f_2}{f_1} d_1 - \frac{f_1}{f_2} d_2 = 0, \qquad (2)$$
$$d_1, d_2 \geq 0,$$

then plane $\pi_2$ is merely an inverted geometrical image plane of plane $\pi_1$ with magnification $$M = +f_2/f_1. \qquad (3)$$

The effect, apart from an adjustable magnification, is to merely translate (and invert) the entire ray distribution at plane $\pi_1$ to plane $\pi_2$.

The ray matrix and the ABCD law (see A. Yarivig, Introduction to Optical Electronics [Holt, Rinehart and Winston, N.Y., 1971] Chapters 2 and 3) may also be used to determine the diffraction effects of the system of FIG. 3. The complex propagation parameter, q, for a Laguerre-Gaussian mode expansion of an electric field component is expressed as:

$$\frac{1}{q} = \frac{1}{R} - \frac{i}{2kW^2} \quad (i = \sqrt{-1}) \qquad (4)$$

where R is the beam radius of curvature, W is the radius of the beam waist and $k = 2\pi/\lambda$ is the beam wave number. The values of q in the planes $\pi_1$ and $\pi_2$ are related by $$q_2 = \frac{Aq_1 + B}{Cq_1 + D} = \frac{A}{D} q_1 = \left(\frac{f_2}{f_1}\right) q_1 \qquad (5)$$

Thus, the phase of $q_2$ is the same as the phase of $q_1$, so that the phase of each Laguerre-Gaussian mode is also the same in the two planes $\pi_1$ and $\pi_2$. An arbitrary complex wave form in $\pi_1$ is thus merely inverted and magnified ($M = -f_2/f_1$ in $\pi_2$ with no other change: the system in FIG. 3 acts as an optical relay, relaying a complex wave form from $\pi_1$ to $\pi_2$ with minimal distortion.

The effect of the pinhole 11 has been neglected in the ray matrix. This is arguably justified if the pinhole radius $r_O$ is sufficiently large. In fusion layers, the pinhole radius typically satisifies $$r_O a / \lambda f \approx 7-10,$$

f = focal length of input lens,
a = beam radius at input.

Figure 3:
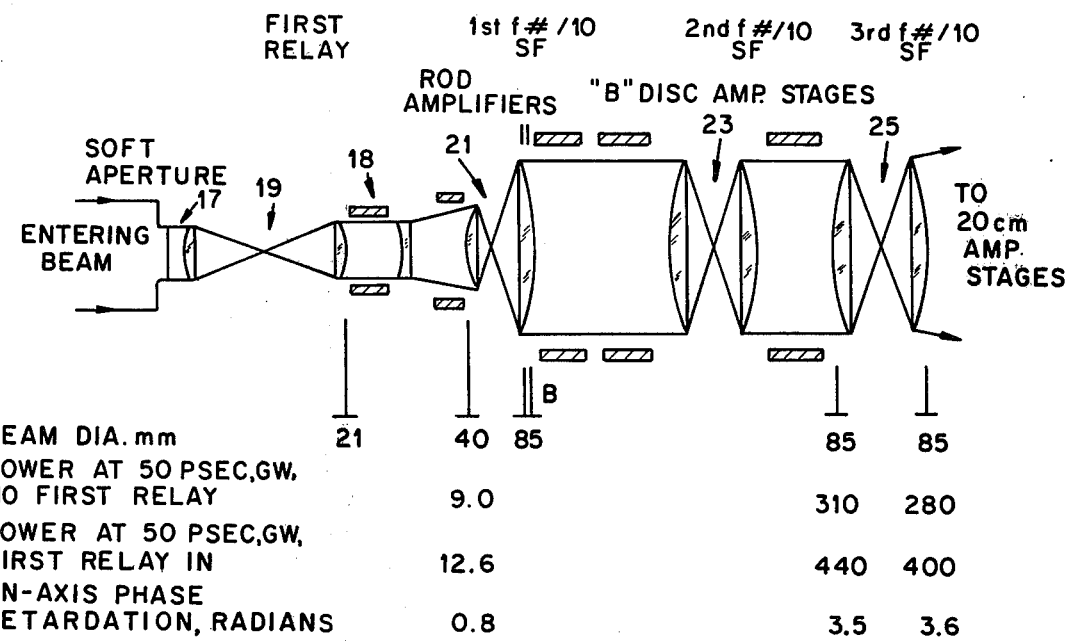
FIG. 3 schematically illustrates one arm of the Argus glass laser system incorporating the invention.

For example, in one recent experiment on the laser fusion system known as Argus, replicas of the spatial filter assembly were placed between apodizer 17 and rod amplifier 18, as indicated at 19, and in addition were located at positions 21, 23, and 25 in FIG. 3, with corresponding pinhole radii $r_{21} = r_{23} = r_{25} = 300$ microns. The effect of self-focusing was reduced to the extent that peak beam power through each arm of Argus could be increased to $\approx 2$ TW (from 1-1.5 TW without the present invention). A new Argus experiment using pinhole radii of $r_{21} = r_{23} = 300$ μm and $r_{25} = 400$ μm allowed peak beam power to reach 2.5 TW in each arm. Previously, Argus produced $1-2 \times 10^9$ neutrons/target burst. With the increase in peak beam power resulting from the present invention, the neutron yield will reach $5 \times 10^9$/target burst, which represents a three order of magnitude increase in neutron yield over the laser system known as Cyclops.

By judicious placement of the relay elements at various positions in the optical train, the input beam at each such point can be optically relayed through various amplification stages with minimal aberration and phase distortion. The effective optical path length between relay elements can be made zero, thereby minimizing diffraction effects and reducing whole beam self-focusing. The beam power, which is currently limited by the development of self-focusing, may thus be increased, with a corresponding increase in laser fusion system performance.

Thus, it has been shown that the present invention provides a means which allows a laser beam to be optically relayed through various amplification stages of a high power laser system, such as for laser fusion applications, with minimal nonlinear aberration, phase distortion, diffraction, and self-focusing. The present invention clearly has application as an optical relay wherever high power laser amplification is employed and will increase the focusable power of the laser.

While a particular embodiment of the invention has been illustrated and described, modifications will become apparent to those skilled in the art, and it is intended to cover in the appended claims, all such modifications as come within the spirit and scope of the invention.

What we claim is:

1. An apparatus acting as an optical relay which translates substantially all rays in a laser beam from an initial position where the power density is low through a plurality of high power amplification stages to a downstream position where the effective optical path length from said initial position is substantially zero and the power density is high with minimal diffraction effects, phase distortion and beam intensity fluctuations, said apparatus comprising at least one spatial filter assembly positioned at a selected spaced relation between said amplification stages; said spatial filter assembly consisting of a pair of lenses separated by a distance equal to the sum of their focal lengths and positioned in selected spaced relationship with respect to said amplification stages to define an optical relay, and means defining a pinhole positioned substantially at a common focal plane of said two lenses.

2. The apparatus defined in claim 1, in combination with a glass laser system having a plurality of successive amplification stages with graduated apertures, each adjacent pair of said successive amplification stages having a spatial filter assembly positioned therebetween.

3. The combination defined in claim 2, additionally including a spatial filter assembly positioned upstream of a first of said plurality of successive amplification stages.

4. An apparatus for optically relaying a laser beam from an initial position where the power density is low through a plurality of high power amplification stages to a downstream position where the effective optical path length from said initial position is substantially zero and the power density is high with minimal diffraction effects, phase distortion and beam intensity fluctuations, said apparatus comprising: means for amplifying the laser beam; and means positioned in selected spaced relation to said amplifying means for optically relaying the beam, said optically relaying means consisting of at least one pair of lenses positioned at a distance from each other equal to the sum of the focal lengths of the pair of lenses, and means defining a pinhole positioned substantially at a common focal plane of said pair of lenses, such that the laser beam amplified by said amplifying means is optically relayed from one position to a downstream position with minimal effective optical path length difference between said one position and said downstream position and minimal nonlinear diffraction effects, phase distortion and beam intensity variation.

5. The apparatus defined in claim 4, wherein said amplifying means consists of at least three successive amplification stages with graduated apertures, and wherein an optically relaying means is positioned intermediate each adjacent pair of successive amplification stages.

6. A method for optically relaying a laser beam from one position through a plurality of amplification stages to a downstream position with minimal effective optical path length difference between said one position and said downstream position and minimal diffraction effects nonlinear phase distortion and beam intensity variation, comprising the steps of: directing the laser beam through a plurality of amplification stages, and positioning an optical relay assembly intermediate and in selected spaced relationship to each of the plurality of amplification stages for a substantially zero effective optical path length.

7. The method defined in claim 6, additionally including the step of forming the optical relay assembly from a pair of spaced lenses located with respect to each other at a distance equal to the sum of their focal lengths, and positioning a pinhole defining means at substantially the common focal plane of said pair of lenses.

* * * * *